(12) United States Patent
Janakiraman et al.

(10) Patent No.: US 7,788,664 B1
(45) Date of Patent: Aug. 31, 2010

(54) METHOD OF VIRTUALIZING COUNTER IN COMPUTER SYSTEM

(75) Inventors: Gopalakrishnan Janakiraman, Sunnyvale, CA (US); Aravind Menon, Lausanne (CH); Jose Renato Santos, San Jose, CA (US); Yoshio Frank Turner, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1331 days.

(21) Appl. No.: 11/270,113

(22) Filed: Nov. 8, 2005

(51) Int. Cl.
G06F 9/455 (2006.01)
(52) U.S. Cl. .......................................... 718/1; 718/108
(58) Field of Classification Search ................. 717/130; 718/1, 108
See application file for complete search history.

(56) References Cited

U.S. PATENT DOCUMENTS

| | | | | |
|---|---|---|---|---|
| 3,827,357 | A * | 8/1974 | Mahoney | 358/1.16 |
| 5,355,484 | A * | 10/1994 | Record et al. | 717/127 |
| 5,606,671 | A * | 2/1997 | Wadsworth et al. | 710/106 |
| 5,659,679 | A * | 8/1997 | Alpert et al. | 714/34 |
| 6,212,574 | B1 * | 4/2001 | O'Rourke et al. | 719/321 |
| 6,279,113 | B1 * | 8/2001 | Vaidya | 726/23 |
| 6,662,358 | B1 | 12/2003 | Berry et al. | |
| 6,735,758 | B1 | 5/2004 | Berry et al. | |
| 7,401,324 | B1 * | 7/2008 | Dmitriev | 717/130 |
| 2004/0010785 | A1 * | 1/2004 | Chauvel et al. | 717/158 |
| 2005/0132364 | A1 * | 6/2005 | Tewari et al. | 718/1 |

OTHER PUBLICATIONS

Jennifer M. Anderson et al., Continuous Profiling: Where Have All the Cycles Gone?, SRC Technical Note 1997-016a, 1997, Systems Research Center, Palo Alto, CA.
Paul Barham et al., Xen and the Art of Virtualization, Proceedings of the nineteenth ACM symposium on Operating systems principles, 2003, pp. 164-177, ACM Press, New York, NY.
Bryan Clark et al., Xen and the Art of Repeated Research, Proceedings of the FREENIX Track: 2004 USENIX Annual Technical Conference, Jun. 27, 2004, pp. 135-144, The USENIX Association, Berkeley CA.
Aaron J. Goldberg et al., Mtool: An Integrated System for Performance Debugging Shared Memory Multiprocessor Applications, IEEE Transactions on Parallel and Distributed Systems, 1993, 4(1):28-40, IEEE, New York, NY.

(Continued)

Primary Examiner—Li B Zhen
Assistant Examiner—Blake Kumabe

(57) ABSTRACT

An embodiment of a method of virtualizing a counter in a computer system comprises a first step and iterative performance of second through fifth steps. In the first step, a virtual machine monitor programs a hardware event counter with an initial count for a profiling event for a virtual machine. In the second step, the virtual machine monitor saves a suspension count and disables the hardware event counter upon suspending operation of the virtual machine. In the third step, the virtual machine monitor programs the hardware event counter with the suspension count upon resuming the operation of the virtual machine. Upon receiving an interrupt from the hardware event counter that provides notification of reaching the initial count, the virtual machine monitor performs the fourth and fifth steps. In the fourth step, the virtual machine monitor saves a sample that comprises an event identifier and a code-in-execution indicator. In the fifth step, the virtual machine monitor reprograms the hardware event counter with the initial count.

24 Claims, 2 Drawing Sheets

OTHER PUBLICATIONS

Xenoprof—System-wide profiler for Xen VM, Apr. 2005, Hewlett-Packard Development Company, L.P., Palo Alto, CA. <http://xenoprof.sourceforge.net/>.

Aravind Menon et al., XENOPROF—Performance profiling in Xen: User Guide, Version 1.0, Apr. 8, 2005, Hewlett-Packard Co. Palo Alto, CA.

Aravind Menon et al., Diagnosing Performance Overheads in the Xen Virtual Machine Environment, HP Labs Technical Report HPL-2005-80 May 6, 2005, Hewlett-Packard Development Company, L.P., Palo Alto, CA.

Aravind Menon et al., XENOPROF—Performance profiling in Xen: User Guide, Version 1.1, May 25, 2005, Hewlett-Packard Co. Palo Alto, CA.

Shirley V. Moore, A Comparison of Counting and Sampling Modes of Using Performance Monitoring Hardware, 2002, Knoxville, TN.

Brinkley Sprunt, The Basics of Performance Monitoring Hardware, IEEE Micro, 2002, 22(4):64-71, IEEE Computer Society, New York, NY, Los Alamitos, CA.

Brinkley Sprunt, Pentium 4 Performance Monitoring Features, IEEE Micro, 2002, 22(4):72-82, IEEE Computer Society, New York, NY, Los Alamitos, CA.

Andrew Whitaker et al., Constructing Services with Interposable Virtual Hardware, Mar. 29, 2005, Seattle, WA.

Jose Renato Santos et al. United States Patent Application No., filed Nov. 8, 2005.

Yoshio Frank Turner et al. et al. United States Patent Application No., filed Nov. 8, 2005.

\* cited by examiner

METHOD OF VIRTUALIZING COUNTER IN COMPUTER SYSTEM

RELATED APPLICATIONS

This application is related to U.S. application Ser. Nos. 11/270,137 and 11/270,089, filed on Nov. 8, 2005 (the same day as this application), the contents of which are hereby incorporated by reference.

FIELD OF THE INVENTION

The present invention relates to the field of computing. More particularly, the present invention relates to the field of computing where event sampling is performed in a computer system operating a plurality of virtual machines.

BACKGROUND OF THE INVENTION

Hardware performance counters are processor registers that count performance events such as cache misses, virtual memory translation look-aside buffer misses, and number of executed instructions. Some software profiling tools employ hardware performance counters to sample hardware events associated with code execution in order to characterize software performance. OProfile for Linux is an example of such a software profiling tool. Such software profiling tools operate above or within an operating system that in turn operates directly on computer hardware. To profile a specific event, a hardware performance counter is programmed to generate an interrupt to the operating system upon the hardware performance counter reaching a specified count for the specific event. Upon receiving the interrupt, the interrupt handler of the operating system reads the program counter at the time of the interrupt to determine the software that was executing when the hardware performance counter reached the specified count. Typically, the hardware performance counter is reprogrammed each time it expires, which generates a sequence of samples for the specific event. The sequence of samples provides a statistical distribution for the specific event, which may be used to characterize software that was executing while the samples were taken. This provides insight into the portion of the software that is generating the most instances of the specific event. For example, a particular sequence of samples may track instructions that are executing most often. Multiple hardware events may be simultaneously profiled to improve the characterization of the software. Usually, software profiling tools such as OProfile use a non-maskable interrupt upon reaching the specified count since non-maskable interrupts allow profiling of system software that runs with interrupts disabled. However, a maskable interrupt is sometimes used when profiling software that executes with interrupts enabled.

A virtual machine monitor is a software layer that interposes between one or more operating system instances and computer hardware. Sometimes the virtual machine monitor is referred to as a hypervisor, which is a reference to the virtual machine monitor's privilege level. It is a "hypervisor" because its privilege level exceeds a "supervisor" privilege level of an operating system's kernel mode. Each operating system instance is referred to as a virtual machine, which is capable of running its own applications. The virtual machine monitor allocates processor time and memory space to each virtual machine. For example, consider first and second virtual machines that are operating above a virtual machine monitor. In a first time period, the processor is allocated to the first virtual machine; in a second time period, the processor is allocated to the second virtual machine; in a third time period, the processor is allocated to the first virtual machine again; and so forth. Because a virtual machine that hosts an operating system might not be operating when an interrupt is issued, the operating system hosted by the virtual machine is unable to reliably receive interrupts. This makes profiling tools inoperable in virtual machines.

SUMMARY OF THE INVENTION

The present invention comprises a method of virtualizing a hardware event counter in a computer system. According to an embodiment, the method comprises a first step and iterative performance of second through fifth steps. In the first step, a virtual machine monitor programs a hardware event counter with an initial count for a profiling event for a virtual machine. In the second step, the virtual machine monitor saves a suspension count and disables the hardware event counter upon suspending operation of the virtual machine. In the third step, the virtual machine monitor programs the hardware event counter with the suspension count upon resuming the operation of the virtual machine. Upon receiving an interrupt from the hardware event counter that provides notification of reaching the initial count, the virtual machine monitor performs the fourth and fifth steps. In the fourth step, the virtual machine monitor saves a sample that comprises an event identifier and a code-in-execution indicator. In the fifth step, the virtual machine monitor reprograms the hardware event counter with the initial count.

These and other aspects of the present invention are described in more detail herein.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT

Figure 1:
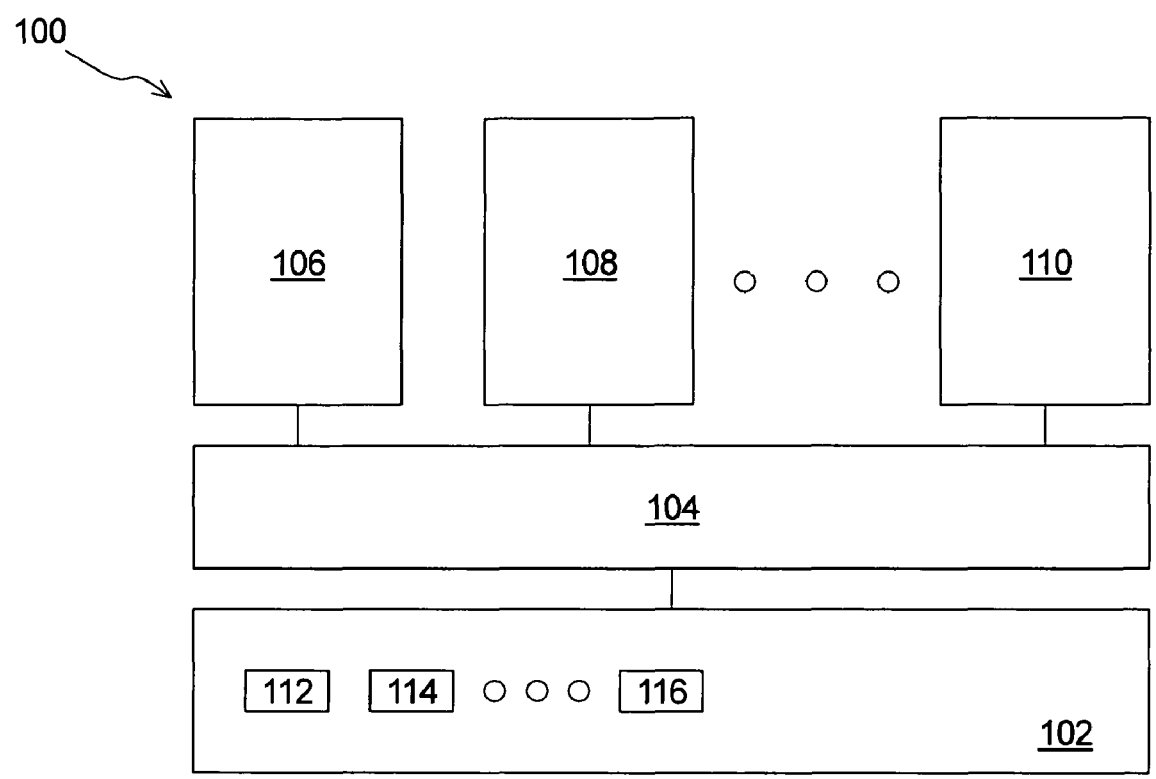
FIG. 1 schematically illustrates a computing system that employs a method of virtualizing a counter in a computer system in accordance with an embodiment of the present invention.

An embodiment of a computing system that employs a method of virtualizing a counter of the present invention is illustrated schematically in FIG. 1. The computing system 100 comprises computer hardware 102, a virtual machine monitor 104, and first through mth virtual machines, 106 . . . 110. The computer hardware 102 includes a processor (not shown), memory (not shown), and first through nth hardware event counters, 112 . . . 116. The first through mth virtual machines, 106 . . . 110, each include an operating system and an ability to execute one or more applications. The virtual machine monitor 104 allocates processor time and memory space to the first through mth virtual machines, 106 . . . 110, such that each of the first through mth virtual machines, 106 . . . 110, is given an abstracted view that it is an individual computer system executing its own operating system and applications. The first through nth hardware event counters, 112 . . . 116, may count any of a number of event types such as performance events, debug events, error events, or security/violation events. One or more of the hardware event counters may be hardware performance counters that count performance events such as executed instructions, clock cycles, cache events, cache hits, cache misses, virtual memory translation look-aside buffer events, virtual memory translation look-aside buffer hits, virtual memory translation look-aside buffer misses, and branch events. More generally, the event type is any event type that may be selected for a processor that is executing code associated with the virtual machine monitor or a virtual machine operating above the virtual machine monitor. Manufacturers of processors include capabilities for monitoring various event types within processors and routinely include additional or other event types in new processors.

Figure 2:
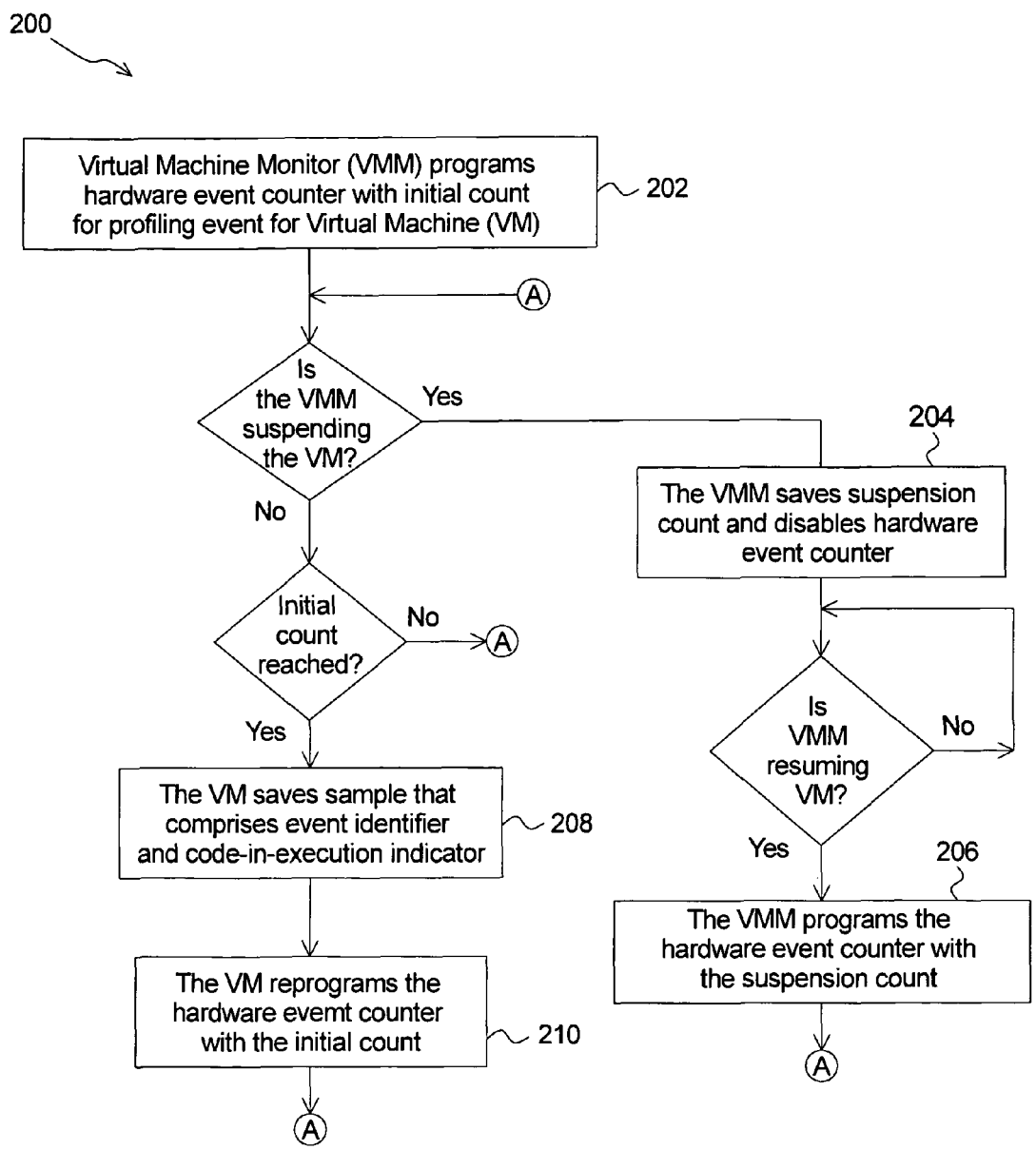
FIG. 2 illustrates an embodiment of a method of virtualizing a counter in a computer system of the present invention as a flow chart.

An embodiment of a method of virtualizing a counter in a computer system of the present invention is illustrated as a flow chart in FIG. 2. The method 200 comprises a first step 202 and iterative performance of second through fifth steps, 204 . . . 210. In the first step 202, a virtual machine monitor (e.g., the virtual machine monitor 104 of FIG. 1) programs a hardware event counter (e.g., the first hardware event counter 112) with an initial count for a profiling event for a virtual machine (e.g., the first virtual machine 106). The hardware event counter may be a dedicated counter that counts a pre-programmed profiling event or it may be a programmable counter that is programmed with the profiling event to count. If the latter, the virtual machine monitor programs the hardware event counter with an event type.

In the allocation of processor time to multiple virtual machines, the virtual machine monitor suspends operation of a particular virtual machine so that one or more other virtual machines can each in turn be allocated processor time before resuming operation of the particular virtual machine. The virtual machine monitor's suspension and resumption of operation of the particular virtual machine and the one or other virtual machines is typically performed in a cyclic manner so that each virtual machine in a computer system may make progress executing its programs.

In the second step 204, the virtual machine monitor saves a suspension count and disables the hardware event counter upon suspending operation of the virtual machine (i.e., the virtual machine for which the virtual machine monitor programmed the initial count). In the third step 206, the virtual machine monitor programs the hardware event counter with the suspension count upon resuming operation of the virtual machine. If the hardware event counter is a programmable counter rather than a dedicated counter, the third step 206 also programs the hardware event counter with the event type. Performance of the second and third steps, 204 and 206, may be performed numerous times before performance of the fourth and fifth steps, 208 and 210.

Upon receiving a non-maskable interrupt from the hardware event counter that notifies the virtual machine monitor that the hardware event counter has reached the initial count for the virtual machine, the virtual machine monitor proceeds with the fourth and fifth steps, 208 and 210. In the fourth step 208, the virtual machine monitor saves a sample that comprises an event identifier and a code-in-execution indicator. The sample may also include an operating mode identifier (i.e., a hypervisor mode, a kernel mode, or a user mode). In the fifth step 210, the virtual machine monitor reprograms the hardware event counter with the initial count.

The code-in-execution indicator may be a program counter, which the virtual machine decrements to determine the instruction executing when the hardware event counter reached the initial count. Alternatively, the code-in-execution indicator may indicate a larger section of code such as a group of instructions, a function, or a software module.

Since, in the fifth step 210, the virtual machine monitor is saving the sample for the virtual machine that is executing, the virtual machine monitor may save the sample in a kernel buffer for the virtual machine. The virtual machine may then flush one or more available samples to storage and perform a statistical analysis upon saving a sufficient number of samples.

In an embodiment, the first step 202 is preceded by the virtual machine requesting that the virtual machine monitor program the hardware event counter with the initial count for the profiling event.

The second through fifth steps, 204 . . . 210, continue until interrupted or until reaching an end condition.

An embodiment of the method 200 may be employed by a method of sampling hardware events, which is the subject of related U.S. patent application Ser. No. 11/270,089 filed on (the same day as this application).

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method of virtualizing a counter in a computer system comprising the steps of:
   a virtual machine monitor:
      programming a hardware event counter with an initial count which is a specific count number that must be reached before the hardware event counter generates an interrupt for a profiling event for a virtual machine; and
      iteratively performing the steps of:
         using a virtual machine monitor to suspend operation of the virtual machine while processor time and memory space is allocated to another virtual machine, and upon suspending operation of the virtual machine, saving a suspension count representing a then present count number of the hardware event counter and disabling the hardware event counter;
         upon resuming the operation of the virtual machine, programming the hardware event counter with the suspension count; and
         upon receiving an interrupt to the virtual machine from the hardware event counter that provides notification of reaching the initial count:
            saving a sample that comprises an event identifier identifying an event type of the profiling event and a code-in-execution indicator representing an instruction that was executing when the initial count was reached; and
            reprogramming the hardware event counter with the initial count.

2. The method of claim 1 wherein the step of programming the hardware event counter further comprises programming the hardware event counter with the event identifier identifying the event type of the profiling event to count an event type.

3. The method of claim 2 wherein the step of programming the hardware event counter with the suspension count further comprises programming the hardware event counter with the event type.

4. The method of claim 1 wherein the step of programming the hardware event counter with the initial count is in response to a request by the virtual machine.

5. The method of claim 1 wherein the sample further comprises an operating mode identifier.

6. The method of claim 5 wherein the operating mode identifier is selected from a hypervisor mode, a kernel mode, and a user mode.

7. The method of claim 1 further comprising the step of the virtual machine accessing the sample.

8. The method of claim 7 wherein the code-in-execution indicator comprises a program counter at a time of the interrupt.

9. The method of claim 8 further comprising the virtual machine decrementing the program counter to determine an event-associated instruction.

10. The method of claim 9 further comprising the virtual machine saving a modified sample including a larger section of code than just the instruction that was executing when the initial count was reached.

11. The method of claim 10 wherein the modified sample comprises the event identifier and the event-associated instruction identifier.

12. The method of claim 10 further comprising the virtual machine flushing the modified sample to storage.

13. The method of claim 12 further comprising the step of performing a statistical analysis upon a series of modified samples.

14. The method of claim 7 further comprising the virtual machine correlating the code-in-execution indicator to particular computer code.

15. The method of claim 14 wherein the particular computer code is selected from a particular software module, a particular function, a particular group of instructions, and a particular instruction.

16. The method of claim 1 wherein the interrupt is a non-maskable interrupt.

17. The method of claim 1 wherein the step of the virtual machine monitor saving the sample saves the sample in a buffer.

18. The method of claim 1 wherein the profiling event is selected from performance events, debug events, error events, and security violation events.

19. The method of claim 1 wherein the profiling event is selected from executed instructions, clock cycles, cache events, cache hits, cache misses, virtual memory translation look-aside buffer events, virtual memory translation look-aside buffer hits, virtual memory translation look-aside buffer misses, and branch events.

20. A method of virtualizing a counter in a computer system comprising the steps of
a virtual machine monitor:
programming a hardware event counter with an initial count which is a specific count number that must be reached before the hardware event counter generates an interrupt for a profiling event while each of a plurality of virtual machines operate; and
iteratively performing the steps of:
using a virtual machine monitor to suspend operation of the virtual machine while processor time and memory space is allocated to another virtual machine, and upon suspending operation of the virtual machine, saving a suspension count representing a then present count number of the hardware event counter and disabling the hardware event counter;
upon resuming the operation of the virtual machine, programming the hardware event counter with the suspension count; and
upon receiving an interrupt to the virtual machine from the hardware event counter that provides notification of reaching the initial count:
saving a sample that comprises an event identifier identifying an event type of the profiling event and a code-in-execution indicator representing an instruction that was executing when the initial count was reached; and
reprogramming the hardware event counter with the initial count.

21. The method of claim 20 wherein the initial count for a first virtual machine is different from the initial count for a second virtual machine.

22. The method of claim 20 wherein the profiling event for a first virtual machine is different from the profiling event for a second virtual machine.

23. A computer system including non-transitory computer hardware having executable instructions stored thereon which are executed for implementing a method of virtualizing a counter in the computer system, the method of virtualizing the counter comprising the steps of:
a virtual machine monitor:
programming a hardware event counter with an initial count which is a specific count number that must be reached before the hardware event counter generates an interrupt for a profiling event for a virtual machine; and
iteratively performing the steps of:
using a virtual machine monitor to suspend operation of the virtual machine while processor time and memory space is allocated to another virtual machine, and upon suspending operation of the virtual machine, saving a suspension count representing a then present count number of the hardware event counter and disabling the hardware event counter;
upon resuming the operation of the virtual machine, programming the hardware event counter with the suspension count; and
upon receiving an interrupt to the virtual machine from the hardware event counter that provides notification of reaching the initial count:
saving a sample that comprises an event identifier identifying an event type of the profiling event and a code-in-execution indicator representing an instruction that was executing when the initial count was reached; and
reprogramming the hardware event counter with the initial count.

24. A computer system including non-transitory computer hardware having executable instructions stored thereon which are executed for implementing a method of virtualizing a counter in the computer system, the method of virtualizing the counter comprising the steps of:
a virtual machine monitor:
programming a hardware event counter with an initial count for a profiling event while each of a plurality of virtual machines operate; and
iteratively performing the steps of:
using a virtual machine monitor to suspend operation of the virtual machine while processor time and memory space is allocated to another virtual machine, and upon suspending operation of the virtual machine, saving a suspension count representing a then present count number of the hardware event counter and disabling the hardware event counter;

upon resuming the operation of the virtual machine, programming the hardware event counter with the suspension count; and upon receiving an interrupt to the virtual machine from the hardware event counter that provides notification of reaching the initial count:
saving a sample that comprises an event identifier identifying an event type of the profiling event and a code-in-execution indicator representing an instruction that was executing when the initial count was reached; and
reprogramming the hardware event counter with the initial count.

* * * * *

UNITED STATES PATENT AND TRADEMARK OFFICE
CERTIFICATE OF CORRECTION

PATENT NO. : 7,788,664 B1  Page 1 of 1
APPLICATION NO. : 11/270113
DATED : August 31, 2010
INVENTOR(S) : Gopalakrishnan Janakiraman et al.

It is certified that error appears in the above-identified patent and that said Letters Patent is hereby corrected as shown below:

In column 5, line 46, in Claim 20, after "of" insert -- : --.

Signed and Sealed this
Third Day of May, 2011

David J. Kappos
*Director of the United States Patent and Trademark Office*